US008239294B2

(12) United States Patent
Agrawal et al.

(10) Patent No.: US 8,239,294 B2
(45) Date of Patent: Aug. 7, 2012

(54) METHOD OF GENERATING MULTIPLE RECOMMENDATIONS FOR MULTI-OBJECTIVE AVAILABLE-TO-SELL (ATS) OPTIMIZATION PROBLEM

(75) Inventors: Vikas Agrawal, Danbury, CT (US); Thomas R. Ervolina, Poughquag, NY (US); Yunhee Jang, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 6 days.

(21) Appl. No.: 12/715,545

(22) Filed: Mar. 2, 2010

(65) Prior Publication Data

US 2010/0179863 A1 Jul. 15, 2010

Related U.S. Application Data

(62) Division of application No. 11/203,943, filed on Aug. 15, 2005.

(51) Int. Cl.
*G06Q 10/00* (2006.01)
(52) U.S. Cl. .......... 705/28; 434/107; 434/219; 434/322; 434/118; 706/11; 706/12; 706/14; 706/45; 705/7; 705/8; 705/10; 705/26; 705/27; 705/35; 705/36; 705/1; 705/29; 705/22; 705/80
(58) Field of Classification Search ...................... 705/28
See application file for complete search history.

(56) References Cited

U.S. PATENT DOCUMENTS

| 6,138,103 | A | 10/2000 | Cheng et al. | |
|---|---|---|---|---|
| 7,092,929 | B1 * | 8/2006 | Dvorak et al. | ................... 705/28 |
| 2001/0047293 | A1 * | 11/2001 | Waller et al. | .................... 705/10 |
| 2002/0143669 | A1 * | 10/2002 | Scheer | ............................. 705/28 |
| 2003/0139952 | A1 | 7/2003 | Lubash et al. | |
| 2003/0204455 | A1 | 10/2003 | Eck et al. | |
| 2004/0024628 | A1 | 2/2004 | Eck et al. | |
| 2005/0209948 | A1 * | 9/2005 | Ballow et al. | ................... 705/36 |

OTHER PUBLICATIONS

Case studies: The 2003 Information Management Project Awards, Ozimek, John. Journal of Database Marketing & Customer Strategy Management , v12n1 , p. 55-79 , Sep. 2004 (includes References).*
Halley, Alain and Nollet, Jean. The Supply chain: The weak link for some preferred suppliers? Summer 2002. vol. 38, No. 3, pp. 39-47.

* cited by examiner

*Primary Examiner* — F. Ryan Zeender
*Assistant Examiner* — Fawaad Haider
(74) *Attorney, Agent, or Firm* — DeLio & Peterson, LLC; Kelly M. Nowak; Wenjie Li

(57) ABSTRACT

Methods, systems and apparatus for providing a variety of end product build plans based on multiple business scenarios for exhausting excess inventory. Raw financial data and variable scaling factors are input into a scenario engine component along with a business objective that contains logic. The scaling factor may be embedded within the logic of the business objective, or it may be selected by a user to indicate the user's preferences. The scenario engine then applies the financial data and variable scaling factor inputs to the business objective logic to generate modified financial data. The logic of the business objective may also be manipulated to provide modified logic. The modified financial data, and optionally the modified logic, are then input into an optimizer component for determining multiple portfolios for end products that, if built, would consume excess inventory.

14 Claims, 3 Drawing Sheets

METHOD OF GENERATING MULTIPLE RECOMMENDATIONS FOR MULTI-OBJECTIVE AVAILABLE-TO-SELL (ATS) OPTIMIZATION PROBLEM

This is a divisional application of U.S. patent application Ser. No. 11/203,943, filed on Aug. 15, 2005.

BACKGROUND OF THE INVENTION

1. Field of the Invention

The present invention is directed generally to inventory management, and in particular, to methods, systems and apparatus for providing multiple business scenarios for utilizing excess inventory in a manufacturing environment.

2. Description of Related Art

In today's manufacturing environment, products and technologies are continually and rapidly evolving with an increased rate in engineering changes in design developments. It is these engineering changes that typically lead to excess inventory. Excess inventory, which includes surplus inventory, is problematic for manufacturers since the manufacturer is burdened with such inventory, often leading to increased costs for the manufacturer and substantial losses in both manufacturing time and profits.

Prior art has focused on reducing inventory levels by finding ways to shorten the pipeline and reduce lead times. Attempts at solving the problems associated with excess inventory include developing a build plan for end products that would consume as many of these excess parts as possible. Conventionally, these build plans are generated manually. However, manually generated build plans for end products is undesirable since this approach is labor intensive, requiring investigating individual choices one at a time, and is often impracticable when an excess part could be used in several alternative saleable items, each of which might consume various quantities of other excess parts.

Other known approaches of plan building for utilizing excess inventory include generating end-product plan portfolios based on a predetermined, single business scenario, which is commonly maximization of profit. However, this approach is also undesirable since the manufacturer is only able to provide end-product plan portfolios based on this single business scenario, thereby potentially leaving the manufacturer with remaining excess inventory. Currently, there exists no easy, efficient manner in which a manufacturer can provide a number of optimal end-product plan portfolios based on a variety of different business scenarios for improving the manufacturers capability of exhausting its excess inventory, and thereby reducing any chances of leaving the manufacturer with remaining excess inventory.

Accordingly, a need exists in the art for improved methods, systems and apparatus for identifying excess inventory and providing a variety of end product build plans based on multiple business scenarios for exhausting such excess inventory.

SUMMARY OF THE INVENTION

Bearing in mind the problems and deficiencies of the prior art, it is therefore an object of the present invention to provide methods, systems and apparatus for providing a variety of end product build plans based on multiple business scenarios for exhausting excess inventory.

Another object of the present invention is to provide methods, systems and apparatus for providing a variety of end product build plans based on user defined business scenarios for consuming excess inventory.

It is another object of the present invention to provide methods, systems and apparatus for extending a single scenario Available to Sell (ATS) Optimizer to handle and employ multiple business scenarios.

Still another object of the present invention is to provide easy, efficient methods, systems and apparatus for generating a number of optimal end-product plan portfolios based on a variety of different business scenarios for significantly increasing the amount of excess inventory that is consumed, and thereby reducing a manufacturer's chance of being left with remaining excess inventory.

A further object of the invention is to provide methods, systems and apparatus for significantly reducing manufacturing costs and time by consuming excess inventory.

Other objects and advantages of the invention will in part be obvious and will in part be apparent from the specification.

The above and other objects, which will be apparent to those skilled in art, are achieved in the present invention, which is directed to in a first aspect a method for exhausting excess inventory in a manufacturing environment. The method includes providing raw financial data, a variable scaling factor and a business objective containing logic. Modified financial data is then generated by applying the raw financial data and the variable scaling factor within the logic of the business objective. Using this modified financial data multiple portfolios for end products are determined that, if built, would consume excess inventory. Alternatively, the logic of the business objective may be manipulated using the variable scaling factor to provide modified logic for determining the multiple portfolio end products.

In this aspect, the raw financial data may include raw revenue data, raw component cost data, or even combinations thereof. Other data may also be collected such as, for example, demand forecast data, inventory supply data, bills of materials data, constraint part list data, and combinations thereof. The variable scaling factor may be a global scaling factor, a local scaling factor, or combinations thereof. A global scaling factor indicates a user's willingness to spend additional money for consuming the excess inventory, whereas a local scaling factor indicates a user's assigned relative importance of component parts for use in the end products for distinguishing the component parts from one another. The scaling factor may be embedded within the logic of the business objective, or it may be selected by a user to indicate the user's preferences.

In another aspect, the invention is directed to a method for exhausting excess inventory in a manufacturing environment. The method includes inputting raw financial data, variable scaling factors, and business objective containing logic all into a scenario engine component. Modified financial data is generated within the scenario engine by calculating the raw financial data and the variable scaling factors within the logic of the business objective. This modified financial data is then transmitted from the scenario engine to an optimizer component for determining multiple portfolios for end products that, if built, would consume excess inventory.

In still another aspect, the invention is directed to a system for exhausting excess inventory in a manufacturing environment. The system includes a file containing raw financial data, another file containing variable scaling factors, and still another file containing a business objective containing logic. Also included in the system is a scenario engine component and an optimizer component. The scenario engine component is adapted for receiving the raw financial data, the variable scaling factors and the business objective files for generating files containing modified financial data by applying the raw financial data and the variable scaling factor within the logic of the business objective. The optimizer component is adapted for receiving this modified financial data for determining multiple portfolios for end products that, if built, would consume excess inventory.

In yet another aspect, the invention is directed to a program storage device readable by a processor capable of executing instructions, tangibly embodying a program of instructions executable by the processor to perform method steps for exhausting excess inventory in a manufacturing environment. The method includes providing raw financial data, a variable scaling factor and a business objective containing logic. Modified financial data is then generated by applying the raw financial data and the variable scaling factor within the logic of the business objective. Using this modified financial data multiple portfolios for end products are determined that, if built, would consume excess inventory.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

In describing the preferred embodiment of the present invention, reference will be made herein to FIGS. 1-3 of the drawings in which like numerals refer to like features of the invention.

The present invention is directed to the field of Supply Chain management and, in particular, to the management of excess inventory. One way for companies to profitably manage excess inventory is to find ways to sell products that will consume some, if not all, of its excess inventory. In so doing, most companies offer a wide range of products, whereby each product has a different bill of materials. One way of determining which products to build and sell, such that the excess inventory is consumed, is through Available-To-Sell (ATS) Optimizer tool, such as that disclosed in co-pending U.S. Patent Application No. 2004/0024628, assigned to the assignee of the present application, the disclosure of which is hereby incorporated by reference.

Figure 1:
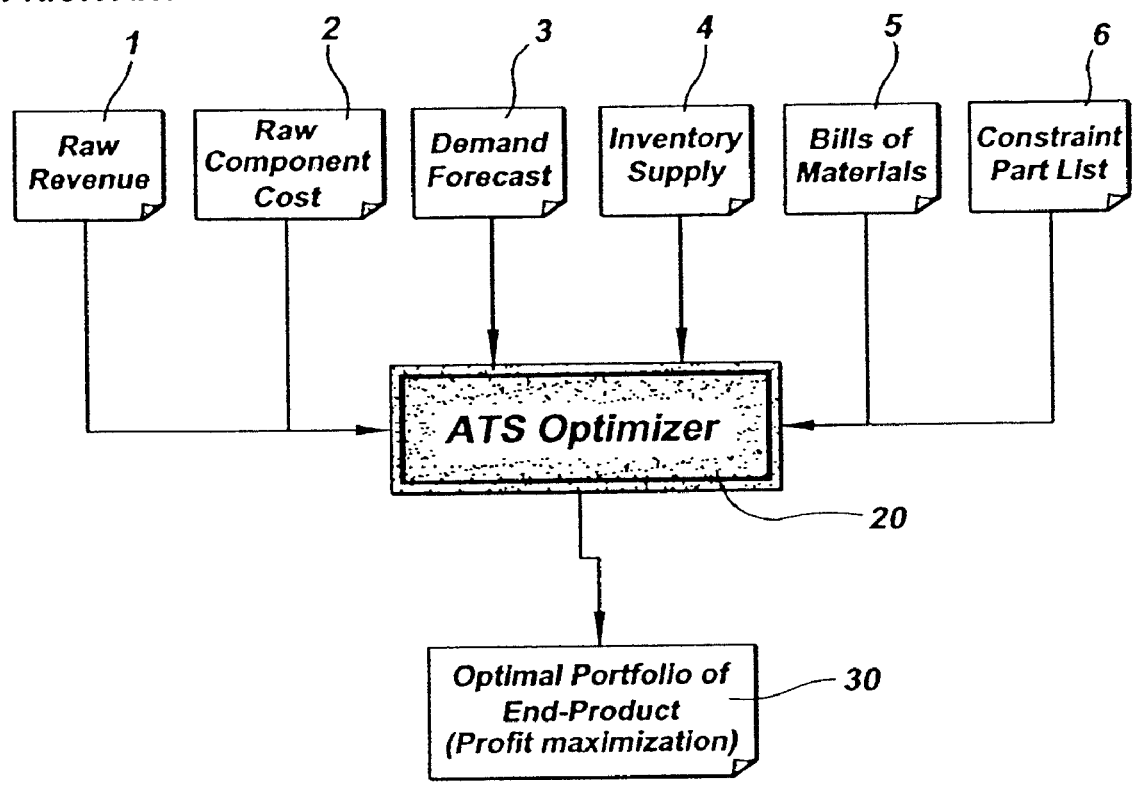
FIG. 1 is a prior art block diagram for facilitating excess inventory utilization management.

FIG. 1 shows a conventional ATS Optimizer system. The ATS Optimizer 20 is an inventory optimization application that takes user provided inputs including, raw revenue 1, raw component cost 2, demand forecast 3, inventory supply 4, bills of materials 5 (BOM), and constraint part list 6, and the like. The ATS Optimizer 20 processed these inputs, and then outputs an optimal portfolio of end products 30 (i.e., a list of saleable end items and products, along with quantities of each) that should be manufactured to consume the excess inventory. However, the ATS tool sets up the problem as a Linear Programming (LP) Optimization model only with the objective of maximizing profits.

For example, a linear ATS LP optimization model with the single objective of maximizing the total profit is formulated as follows:
wherein the decision variables are
$Y^i$ recommendation for saleable item$^i$.
$X_j^i$ supply consumption of component part$^j$ allocated to saleable item$^i$
$X_k^i$ purchasing amount of lowest level component part$^k$, allocated to saleable item$^i$
$X_l^i$ manufacturing operation of non lowest level component part$^l$, allocated to saleable item$^i$;
the simplified LP formulation is:

$$\text{Maximize} \sum_i Value_i \times Y^i - \sum_i \sum_j Cost_j \times Y^i -$$
$$\sum_i \sum_k Cost_k \times X_k^i - \sum_i \sum_l Cost_l \times X_l^i$$

subject to

C1) $\sum_i X_j^i - [\text{excess supply of } j] \leq 0 \, j \in$

{parts with positive supply}

C2) $\sum_i X_k^i = k \in$ {parts limited for any additional purchase}

C2) $\sum_i X_{k'}^i \geq k' \in$ {parts limited for any additional purchase} where
Value$_i$=revenue or added manufacturing cost of saleable item$^i$
Cost$_j$=consuming cost of excess inventory part$^j$ (this cost zero in the model)
Cost$_k$=purchasing cost of lowest level component part$^k$
Cost$_l$=manufacturing or operation cost of non-lowest level part$^l$.

Additional constraints within the above linear ATS LP optimization model may include material requirement constraints, which the manufacturing operations for non-lowest level components are captured, i.e. $X_j^i$. As such, in accordance with this conventional single objective linear ATS LP optimization model the purchase of an additional component part cannot occur if the excess supply of such part exists within current inventory.

However, a significant limitation of the single objective ATS LP optimization model is that it can only find optimal end-product portfolios for a single business objective or a single objective ATS problem, which is typically maximization of profit. Given that the business needs vary from organization to organization and prevalent business environments, a single objective ATS Optimizer often fails to meet the business requirements and objectives. For instance, an end-product portfolio that is optimal under one business objective might score poorly when considered under another business objective.

Thus, the single objective ATS is often impracticable in a company-wide setting since it provides a single recommendation as an output, which may not be suitable from all points of view within the company. For example, from an inventory management point of view, the objective is to use up as much obsolete or soon to-be-obsolete excess inventory as possible.

From the marketing/sales point of view, the objective is to maximize expected revenue against demand forecasting. From the supply management point of view, the objective is to maximize consumption of inventory, while minimizing the consumption or procurement of critical parts, so that the action to remove excess inventory does not aggravate shortfall management. That is, from the company-wide optimization point of view, it is desirable to consider all of the above-mentioned sub-organizational objectives to achieve a company-wide profit optimization.

The present invention provides a solution to the above problem with single objective ATS LP optimization by extending the single objective ATS into an ATS capable of simultaneously solving multiple business objectives. This is accomplished by introducing a Scenario Engine tool into the system, which adds additional value to any company presently using an Available to Sell (ATS) Optimizer.

The Scenario Engine advantageously enables the ATS Optimizer with the ability to solve multi-objective optimization problems. In so doing, the Scenario Engine automatically modifies the raw ATS input data, particularly the raw input financial data, so that the net result of running such data in the ATS provides multiple end product portfolios based on a selected business objective policy. Preferably, a user of the system selects the business objective. The Scenario Engine intercepts the raw ATS input data, and combines it with additional data specific to the user selected business objective. In particular, the Scenario Engine applies logic associated with the selected business objective policy along with scaling factor data to manipulate and modify the raw financial ATS input data for providing modified ATS input data. Encoded within the modified ATS input data is the optimization objective function for the selected business objective, such that, by running this modified data through an ATS Optimizer the generated end-product portfolios are optimal for the selected business objective.

The scaling factor data is an essential component of the invention since it enables providing multiple alternative end-product portfolios, from which a customer will be able to compare, identify and select the best portfolio for providing a solution to the selected business objective policy. In accordance with the invention, the scaling factor data may be embedded within the selected business objective policy, or a user of the system may select it manually. By letting a user choose scaling factors that address the user's objectives, such user can express his/her willingness for spending an additional dollar amount in the optimization. In the invention, each different scaling factor provides a different optimization end-product portfolio solution for providing a simple way to generate various solution sets without changing the optimization model itself.

Figure 2A:
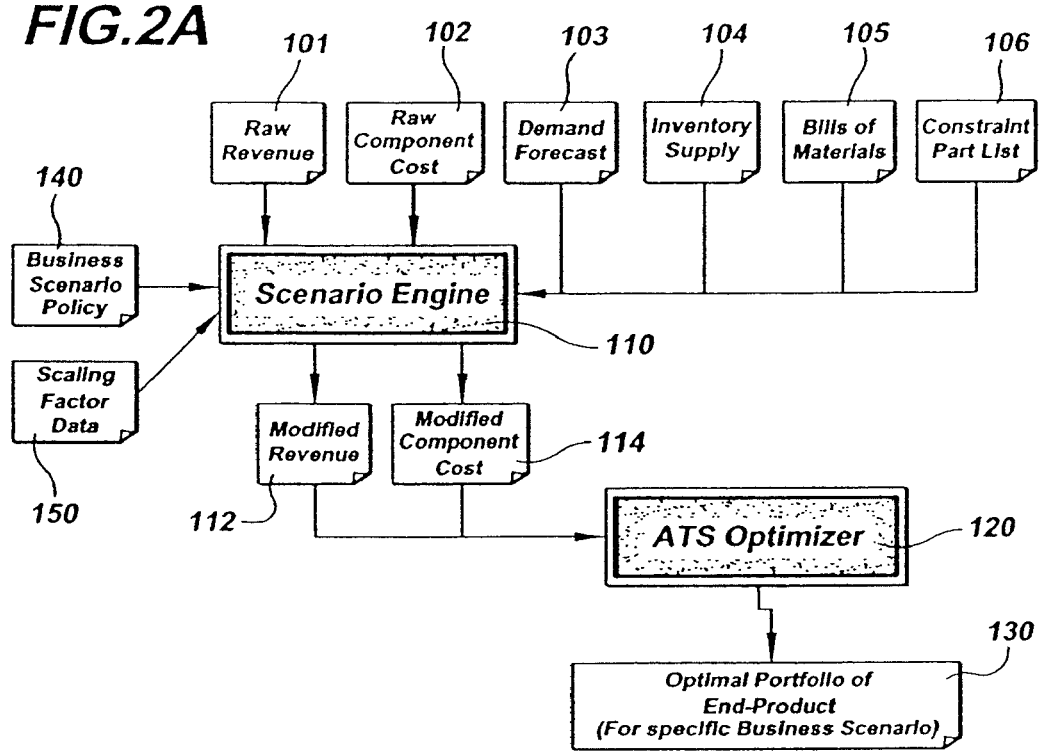
FIG. 2A is a block diagram of an exemplary system of the invention for facilitating excess inventory utilization management based on multiple business scenarios.
Figure 2B:
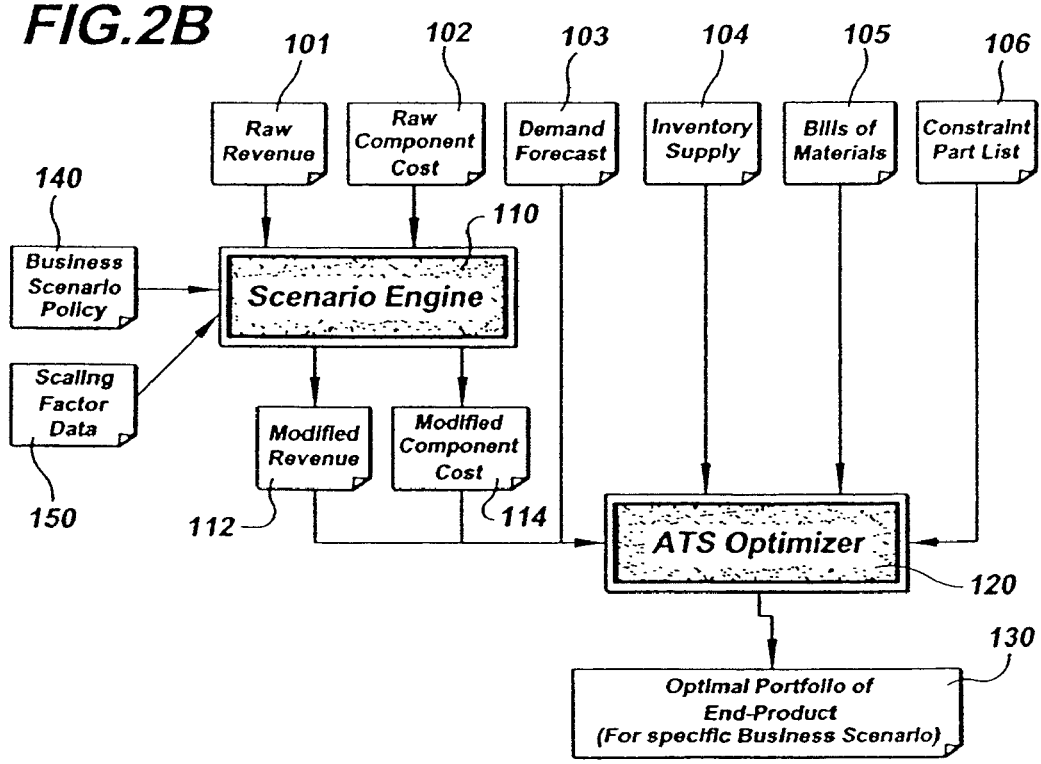
FIG. 2B is a block diagram of alternate exemplary system of the invention for facilitating excess inventory utilization management based on multiple business scenarios

Referring to FIGS. 2A and 2B, block diagrams of exemplary systems of the invention for facilitating excess inventory utilization management based on multiple business objectives are shown. User provided data is input into the Scenario Engine 110. These data inputs include, but are not limited to, raw revenue 101, raw component cost 102, demand forecast 103, inventory supply 104, bills of materials 105 (BOM), and constraint part list 106, and the like. As shown in FIG. 2A, all the user provided inputs may be input into the Scenario Engine 110, or alternatively, only the raw revenue 101 and raw component cost 102 inputs may be input into the Scenario Engine 110 as shown in FIG. 2B. Once received therein, it is only the financial components of the Raw ATS input data, namely, the raw revenue 101 and raw component cost 102 inputs that are modified within the Scenario Engine 110.

In their raw forms, the raw revenue 101 and raw component cost 102 data inputs represent the actual revenue of the end products and the actual cost of the components, respectively. In the conventional ATS system, when this raw ATS data is fed to the ATS Optimizer along with the single static business policy to be solved, the optimal end-product portfolio that is output represents a set of product recommendations that, if built and sold, would provide a single solution to the static business policy. However, in accordance with the invention, by modifying the raw revenue 101 and raw component cost 102 data inputs within the Scenario Engine 110, and inputting such modified data inputs into the ATS Optimizer, multiple end-product portfolios are generated for allowing the user to select the portfolio(s) that provides the best solution to the selected business objective problem being addressed.

The Scenario Engine 110 also receives a selected business objective policy 140 and scaling factor data 150 as inputs for modifying the financial raw revenue 101 and raw component cost 102 data inputs therein. It should be appreciated that depending upon the particular business objective policy 140 selected, it may be desirable to have all the data inputs input into the Scenario Engine 110, as shown in FIG. 2A, since the logic for modifying the costs 102 and revenue 101 data inputs may depend on the other data inputs, namely, the demand forecast 103, inventory supply 104, bills of materials 105 (BOM), and constraint part list 106, etc. Again, the scaling factor data may be predetermined and embedded within the business objective policy, or it may be separate from the business objective policy and independently selected by a user of the system.

The Scenario Engine 110 then applies the scaling factor data to the selected business objective policy for modifying the raw revenue 101 and raw component cost 102 data inputs. In so doing, the Scenario Engine 110 applies a first scaling factor and the raw revenue 101 to the business objective policy for generating modified revenue data 112 that defines a user's willingness to purchase additional items in order to build an end product that will consume the existing excess inventory. The Scenario Engine 110 also applies a second scaling factor and the raw component cost 102 data to the business objective policy for generating modified component cost data 114 that scales costs of constrained components.

The modified revenue data 112 and component cost data 114 are output from the Scenario Engine 110 and input into an ATS Optimizer 120. Encoded within the modified revenue data 112 and component cost data 114 data is the optimization objective function for the originally selected business objective problem(s) to be solved, or optionally, modified LP problem(s) to be solved. Once therein, the ATS Optimizer 120 runs utilizing the modified data inputs to generate multiple end-product portfolios for solving the multi-objective optimization problems.

Figure 3:
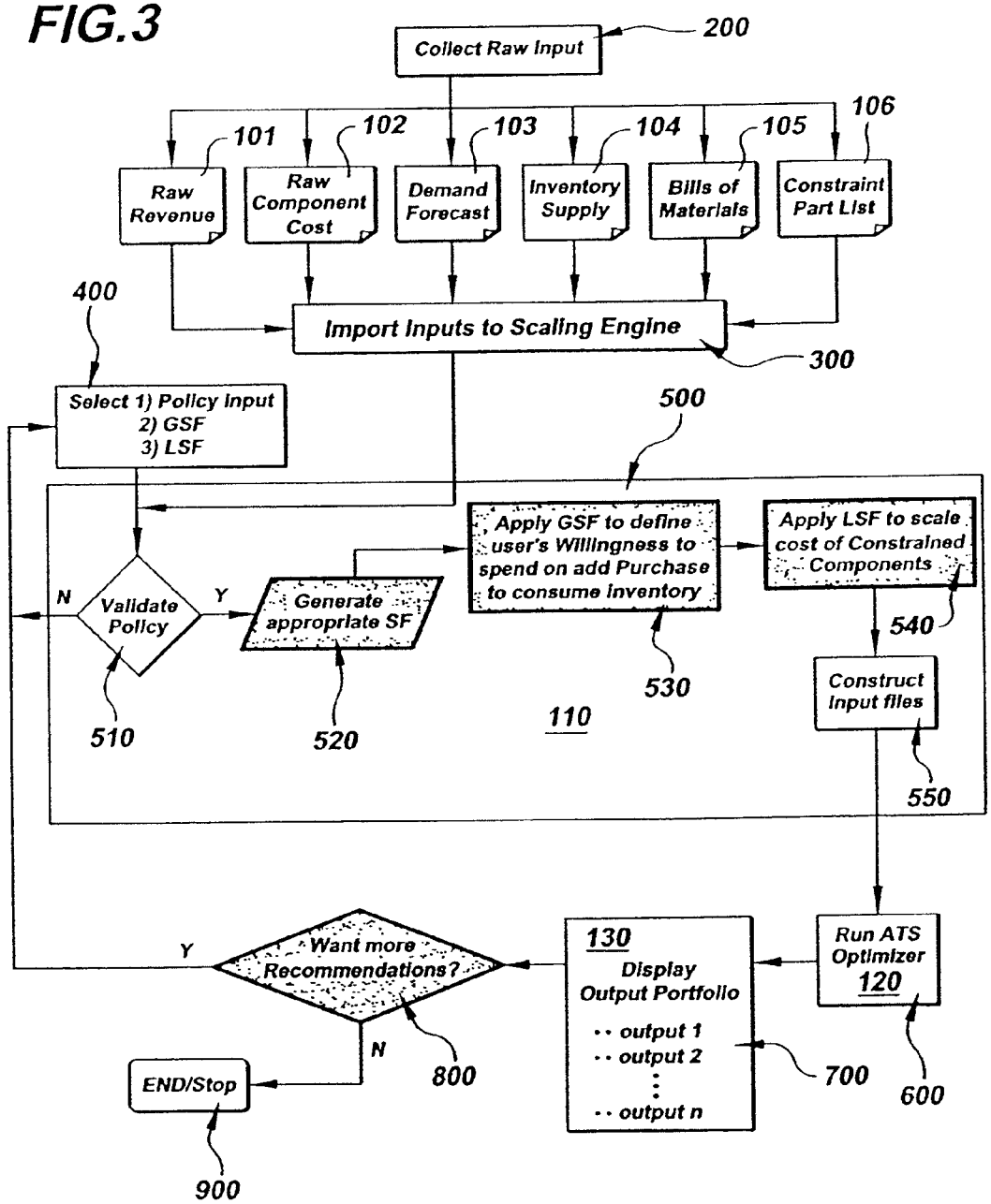
FIG. 3 is a flowchart of the present system for providing a variety of end product build plans based on multiple business scenarios for exhausting excess inventory.

For ease of understanding the invention, reference is made to the process flow of FIG. 3 showing an exemplary flowchart of the present system for LP optimization that provides a variety of end-product build plans based on a selected business objectives for exhausting excess inventory. In this embodiment, it is illustrated how to implement one typical business objective, however, this example is by no means meant to limit the invention in any manner, and it should be obvious to one skilled in the art as to how to create additional objectives.

Upon identifying excess inventory, users of the invention collect raw input data (Step 200), and then the raw input data is imported to the Scenario Engine 110 (Step 300). Also input into the Scenario Engine 110 is the selected business objective policy along with the scaling factors (Step 400). The selected business objective policy may include any pre-configured policy that meets a company or user objective including, but not limited to, maximizing inventory consumption, maximizing revenue or profit, squared set analysis (i.e., identification of additional products needed to purchase in order to built an end-product, this neither maximizes inventory consumption nor revenue/profit), balancing inventory consumption with additional purchases (i.e., has the potential of maximizing inventory consumption and/or revenue/profit), and the like. Again, the scaling factors which include both a first scaling factor, referred to herein as a Global Scaling Factor, and a second scaling factor, referred to herein as a Local Scaling Factor, both of which are discussed in further detail below, may be embedded within the selected business objective policy, or selected by the user separately from the selected business objective policy.

Once the input data is received within the Scenario Engine 110, the Scenario Engine applies the logic of the selected business objective policy to the scaling factors and the financial data inputs (i.e., the raw revenue 101 data input and the raw component cost 102 data input) to generate outputs that include parameter files for the ATS optimizer, along with modified revenue and component cost data outputs (Step 500). This is accomplished through a variety of sub-steps (Steps 510-550) within the Scenario Engine 110. The outputs of the Scenario Engine are input into the ATS Optimizer to perform optimization for dynamically generating an objective function that is conducive to solving the ATS optimization problem within the construct of a given business objective. For example, a user may want to perform an optimization that maximizes the inventory consumptions for the company.

In generating the outputs from the Scenario Engine 110, the Scenario Engine first performs a validation process (Step 510). The validation process ensures that all required inputs are obtained, available and in correct format. The required inputs verified are the selected business objective policy, raw revenue 101 data input and raw component cost 102 data input. If one of these components is not received, the process flow returns to the selection step (Step 400). The Scenario Engine also verifies that the selected business objective policy identification is a valid policy identification that is preconfigured in the Scenario Engine. If it is not, the process flow returns to the selection step.

Once the inputs are verified, the process flow continues by applying the scaling factors. The two different Scaling Factors are the Global Scaling Factor (GSF) and Local Scaling Factor (LSF).

The Global Scaling Factor is an indicator by which a user expresses one's willingness to spend additional monetary amounts (e.g., due to the requirement of needing to purchase additional parts to build a particular end-product) for exhausting the currently available excess inventory and/or achieving a revenue target. The Global Scaling Factor may be any number, symbol, character, and the like, that has the ability to express one's willingness to spend additional money. In the preferred embodiment, the Global Scaling Factor is any non-negative real number that has the ability to scale up, scale down, or combinations thereof, the financial data inputs (i.e., the raw revenue 101 data input and raw component cost 102 data input) in the present LP optimization model.

The Local Scaling Factor is an indicator by which a user assigns relative importance between lower-level component parts and higher-level component parts to distinguish such parts from one another. Similarly, the Local Scaling Factor is any number, symbol, character, and the like, that has the ability to express the user selected preference of the part's importance. In the preferred embodiment, the Local Scaling Factor is also any non-negative real number that also has the ability to be scaled up, scaled down, or combinations thereof, the financial data inputs (particularly, for shortfall component parts) for reflecting the part's relative importance in comparison to other parts. For instance, if an excess inventory part is identified as a hard-to-procure part, or that it needs to be reserved for later use, the user may assign a relatively higher scaling factor (e.g., LSF>1.0) to reflect this part as having a higher-importance as compared to other parts. Similarly, if a part is relatively easier to procure, the user may assign a smaller scaling factor importance (e.g., LSF<1.0) to reflect the part's relatively low-importance.

The Scenario Engine calculates the financial data inputs with the given Global Scaling Factor (Step 530) and Local Scaling Factor (Step 540) in accordance with the logic of the selected business objective policy to result in the modified financial data outputs, particularly, the modified revenue data 112 and the modified component cost data 114 (Step 550). In so doing, the Scenario Engine applies the Global Scaling Factor to define the user's willingness to spend money on additional purchases to consume the excess inventory, and applies the Local Scaling Factor to scale up or down the raw component cost 102 data input of only constrained items. The resultant modified financial data outputs thus reflect both the user's willingness to spend additional money and the user's ratings of importance of particular parts. The modified outputs may also include any changes made to the selected business objective policy problem to be solved. These modified outputs from the scenario engine encapsulate the business objective policy in terms of the optimization model contained in the ATS Optimizer.

For example, the financial data inputs may be multiplied by the given Scaling Factors to result in the modified financial data outputs. In this aspect, Global and Local Scaling Factors greater than one (>1.0) scale the production cost up, whereas a Global and Local Scaling Factor less than one (<1.0) scale the production cost down. For example, wherein the selected business objective of the present LP optimization is for maximizing profits (i.e., producing only those items that will be profitable to the company), larger Global Scaling Factors (e.g., >1.0) cause the production operations to cost more, thereby resulting in less likelihood of such operations being recommended.

An LP optimization model of the invention whereby the Scenario Engine uses Scaling Factor as an upper bound for the cost-to-revenue ratio is formulated as follows:

Let $j \in J(i)$ $J(i)=\{$lower level components or operations for producing item $i\}$;

$j' \in J'(i)$ $J'(i)=\{$lower level components with no excess supplies or operations for producing item $i\}$;

$j'' \in J''(i)$ $J''(i)=\{$lower level components with excess supplies for producing item $i\}$; and where $J' \cap J''=\{\ \}$ and $J' \cup J''=J$ for all demand item $i$.

Using the above notations, the system generated revenue for a demand item $i$ is $$Value_i = \sum_{j \in J} COST^j \text{ for a demand item } i,$$

and the additional cost building an additional unit of demand item $i$ is $$Additional\_Cost_i = \sum_{j'' \in J'} COST^{j'}.$$

There is no cost associated with consuming excess supplies.

The objective function in the LP optimization recommends building more demand units only if such units will be profitable. The following equation should be satisfied for any demand item to be profitable to build.

$$\text{Value}_i > \text{Additional\_Cost}_i$$

In Scenario Engine's cost modeling, $$\text{Additional\_Cost}_i(\text{scaled}) = GSF \times \sum_{j'' \in J'} COST^{j'}$$

Since it applies to all demand items at any component supply level, we have $$\frac{\text{Total\_Cost}}{\text{Total\_Value}} < \text{Max}[1/GSF, 1.0],$$

whereby the Global Scaling Factor applies an upper bound on the ratio of additional-cost to expected-revenue. As examples of the relationship between the Global Scaling Factor and an upper limit on the ratio, when $GSF \leq 1.0$, Total_Value>Total_Cost, or when GSF=2.0, Total_Cost/Total_Value<½=0.5 the Total_Cost can not exceed 50% of Total_Value.

The Scenario Engine 110 constructs the modified financial data files and objective function file, and inputs such files into the ATS Optimizer 120 tool for generating the multiple end-product portfolios based on such input files (Step 550). The input files include a file containing modified revenue data, a file containing modified component costs data, and optionally a file containing modified LP problem formulation(s) to be solved by the optimizer. The Scenario Engine confirms the input formats specified by the ATS optimizer. The remaining input files other than the financial input files may be input into the ATS Optimizer either through the Scenario Engine, or directly imported into the ATS Optimizer from a staging directory.

The ATS Optimizer then solves the problem of the LP model using the objective function, the constructed inputs generated by and input from the Scenario Engine, as well as the various other unchanged input files received from either the Scenario Engine and/or the staging directory (Step 600).

Once generated, the end-product portfolios are displayed to the user for validation by the user (Step 700). The user must then decide whether he/she would like to repeat the process using a different objective (Step 800). If the user would like to repeat the process flow with a new objective, the process flow repeats back to step 400, and the process flow is repeated accordingly. If however the user does not want to repeat the process using a different objective, the system is exited (Step 900).

An essential feature in running the ATS Optimizer with the modified financial inputs is that by varying the scaling factor combinations in accordance with the invention, multiple end-product portfolios are ultimately generated for allowing the user to select the particular product portfolio(s) that provide a solution(s) to the particular problem(s) being solved (i.e., the problem(s) addressed by the selected business objective(s)). That is, the set of alternative end-product portfolios enables the user to compare portfolios, choose a particular portfolio, or even create and choose a mixed portfolio group that best fits the user's decision criteria.

The inclusion of a Scenario Engine is advantageous since it utilizes the input scaling factors to significantly increase the usefulness of a conventional optimization process and system by now being able to provide multiple output end-product portfolio solutions for a given set of input parameters in accordance with the invention. For instance, the multi-objective optimization solutions (or results) of the invention may be able to maximize inventory consumption and expected revenue, while simultaneously minimizing any additional costs, as compared to a conventional ATS Optimizer being limited to only a single optimization solution for a static objective (which is typically maximization of profit) and a given set of data. Advantageously, the Scenario Engine easily and quickly manipulates both the financial input data and the objective function itself, such that, supply chain decisions involving inventory management can be made swiftly.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be evident to those skilled in the art that the present invention provides many improvements over the current state of the art. Data from a variety of systems and locations is being collected into a single database in order to provide a single, integrated repository for ratio planning data for exhausting excess inventory. The invention provides ratio planners with an easy way to pull information together for report, and provides the ability, through the use of pre-defined reports, to generate reports very quickly and with a minimum requirement of computer database expertise. The invention is well suited for both small manufacturers with relatively few ratios as well as very large manufacturers with tens of thousands of ratios.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method for exhausting excess inventory in a manufacturing environment comprising:
   inputting raw financial data into a scenario engine component of a computer;
   inputting variable scaling factors comprising a global scaling factor and a local scaling factor into said scenario engine, said variable scaling factors selected by a user to indicate said user's preferences, the global scaling factor indicating said user's willingness to spend additional money for consuming said excess inventory, said global scaling factor comprises a non-negative real number having the ability to scale up, scale down, or combinations thereof, said input raw financial data;

inputting a business objective containing logic into said scenario engine;

said computer generating modified financial data within said scenario engine by calculating said raw financial data and said variable scaling factors within said logic of said business objective;

transmitting said modified financial data from said scenario engine to an optimizer component of said computer; and utilizing said modified financial data, said computer determining multiple portfolios for multiple end products that, if built, would consume excess inventory.

2. The method of claim 1 wherein said raw financial data is selected from the group consisting of raw revenue data, raw component cost data, and combinations thereof.

3. The method of claim 2 wherein said modified financial data comprise modified revenue data, modified component cost data, and combinations thereof.

4. The method of claim 2 further including inputting a variety of other data inputs into said scenario engine selected from the group consisting of demand forecast data, inventory supply data, bills of materials data, constraint part list data, and combinations thereof.

5. The method of claim 1 further including the step of validating said input raw financial data, said input variable scaling factors and said input business objective within said scenario engine.

6. A method for exhausting excess inventory in a manufacturing environment comprising:

inputting raw financial data into a scenario engine component of a computer;

inputting variable scaling factors comprising a global scaling factor and a local scaling factor into said scenario engine, said variable scaling factors selected by a user to indicate said user's preferences, the local scaling factor indicating said user's assigned relative importance of component parts for use in multiple end products for distinguishing said component parts from one another, said local scaling factor comprises a non-negative real number having the ability to scale up, scale down, or combinations thereof, said input raw financial data;

inputting a business objective containing logic into said scenario engine;

said computer generating modified financial data within said scenario engine by calculating said raw financial data and said variable scaling factors within said logic of said business objective;

transmitting said modified financial data from said scenario engine to an optimizer component of said computer; and utilizing said modified financial data, said computer determining multiple portfolios for said multiple end products that, if built, would consume excess inventory.

7. The method of claim 1 wherein said variable scaling factor is embedded within said logic of said business objective.

8. The method of claim 1 wherein said variable scaling factor is selected by a user to indicate said user's preferences.

9. The method of claim 1 further including modifying said business objective within said scenario engine, and transmitting said modified business objective to said optimizer for determining said multiple portfolios for providing a solution to said modified business objective.

10. The method of claim 1 wherein said multiple portfolios are determined within said optimizer component for providing solutions that would satisfy said business objective.

11. The method of claim 1 further including the step of displaying on a display screen of said computer said multiple portfolios to a user for selection of at least one of said multiple portfolios by said user.

12. The method of claim 1 further including repeating said steps using a new business objective containing logic.

13. The method of claim 1 further including manipulating said logic of said business objective using said variable scaling factor to provide modified logic of said business objective, whereby said multiple portfolios for said multiple end products are determined using said modified financial data in combination with said modified logic.

14. A system for exhausting excess inventory in a manufacturing environment comprising:

a file containing raw financial data;

a file containing variable scaling factors, said variable scaling factors selected by a user to indicate said user's preferences, said variable scaling factors comprising a global scaling factor and a local scaling factor of non-negative real numbers having the ability to scale up, scale down, or combinations thereof, said input raw financial data;

a file containing a business objective containing logic;

a scenario engine component on a computer; and an optimizer component on said computer, wherein said scenario engine component is adapted for receiving said raw financial data, said variable scaling factors and said business objective files for generating files containing modified financial data within said computer by applying said raw financial data and said variable scaling factor within said logic of said business objective, said optimizer component being adapted for receiving said modified financial data for determining multiple portfolios for multiple end products that, if built, would consume excess inventory.

* * * * *